United States Patent [19]

Beery

[11] 4,371,254

[45] Feb. 1, 1983

[54] PROGRAMMED BRAKE FOR CONTROLLING THE SPEED OF A SCANNING CARRIAGE

[75] Inventor: Jack Beery, Fairport, N.Y.

[73] Assignee: Xerox Corporation, Stamford, Conn.

[21] Appl. No.: 193,250

[22] Filed: Oct. 2, 1980

[51] Int. Cl.³ .............................................. G03G 15/28
[52] U.S. Cl. ...................................... 355/8; 355/14 R
[58] Field of Search .............. 355/8, 14 R, 14 C, 3 R; 358/285

[56] References Cited

U.S. PATENT DOCUMENTS

| | | | |
|---|---|---|---|
| 3,424,526 | 1/1969 | Sacre | 355/10 |
| 3,554,640 | 1/1971 | Hoskins | 355/8 |
| 3,907,422 | 9/1975 | Eppe et al. | 355/8 |
| 3,950,091 | 4/1976 | Brooke | 355/8 |
| 3,990,792 | 11/1976 | Kono et al. | 355/8 |
| 4,150,873 | 4/1979 | Dali | 358/285 |
| 4,280,763 | 7/1981 | Arai et al. | 355/14 R |

OTHER PUBLICATIONS

U.S. Ser. No. 80,624 filed 10/1/79 by Warren Hall, Jr., entitled "Open Loop Controller."

*Primary Examiner*—R. L. Moses
*Attorney, Agent, or Firm*—Ronald F. Chapuran

[57] ABSTRACT

The present invention is a programmed brake for controlling the deceleration of a scanning carriage. An encoder including an electro-optic sensor mounted on a moving carriage together with a stationary grating having a plurality of unevenly spaced apertures, provides velocity data of the rate of the relative movement of the sensor and grating during flyback or scan return. In particular, the sensor detects a plurality of light pulses through each of the apertures as the sensor moves relative to the grating. The light signals are conveyed to a counter and the count is compared to a reference number representing a deceleration profile or standard number of signals desired for each aperture. If the number of light signals is less than the standard, occurring if the carriage is overspeed, a transistor driver is pulsed to activate an electromagnetic brake connected to the scanning carriage. When the scanning carriage velocity has slowed sufficiently, the brake is inactivated.

18 Claims, 7 Drawing Figures

FIG. 7
DECELERATION PROFILE

PROGRAMMED BRAKE FOR CONTROLLING THE SPEED OF A SCANNING CARRIAGE

This invention relates generally to an electrostatographic printing machine using scanning optics, and in particular, to a programmed brake for controlling the speed of the scanning optics.

Typically, in an electrostatographic printing machine using scanning optics, a scanning carriage traverses a platen in a first direction from a home position to an end of scan position to project images of a document onto a photoreceptor surface. The scanning carriage is then returned in the reverse direction to the home position to begin the next scanning cycle. The return scan time or flyback time is lost time since no useful images are being projected during this period. It is therefore desirable to return the scanning carriage to the home position in as short a time as possible without undue strain on the scanning components.

One method in the prior art of accomplishing scan return has been to derive the scan return power from a spring. The spring is loaded during the forward scan operation and a dash pot is then used to control the velocity of impact of the carriage on return. The dash pot works like a shock absorber. The carriage, upon striking the dash pot, compresses air inside the dash pot, slowing down the movement of the carriage.

Dash pots, however, are inherently unreliable and they are typically not suited for more than one impact velocity unless having extra features such as a variable orifice. It would therefore be desirable to provide a carriage velocity control that is reliable and easily adapted for multiple impact velocities.

Another method commonly used to control the return of a scanning carriage is a power return. That is, a motor, often the same motor driving the carriage on the forward scan, is used in the return scan. However, a simple power return motor would have a rescan velocity the same as the forward scan velocity. Thus, the time to rescan would be as long as the time for forward scan and would significantly reduce the rate the machine produces copies. On the other hand, a high return speed motor usually requires additional controls, thus adding to the cost of the motor and the cost of the power supply and control. It would therefore be desirable to maintain a high rate of copy output for the machine in providing an economical means for carriage return.

It is therefore an object of the present invention to provide a new and improved speed control system that minimizes carriage return time, that minimizes cost, and that operates reliably regardless of the point of carriage end of scan or return velocity profile. It is a further object of the present invention to provide a programmed brake to control the rescan velocity according to a deceleration profile.

Further advantages of the present invention will become apparent as the following description proceeds and the features characterizing the invention will be pointed out with particularity wn the claims annexed to and forming part of this specification.

Briefly, the present invention is a programmed brake for controlling the deceleration of a scanning carriage. An encoder including an electro-optic sensor mounted on a moving carriage together with a stationary grating having a plurality of unevenly spaced apertures, provides velocity data of the rate of the relative movement of the sensor and grating during flyback or scan return. In particular, the sensor detects a plurality of light pulses through each of the apertures as the sensor moves relative to the grating. The light signals are conveyed to a counter and the count is compared to a reference number representing a deceleration profile or standard number of signals desired for each aperture. If the number of light signals is less than the standard, occurring if the carriage is overspeed, a transistor driver is pulsed to activate an electromagnetic brake connected to the scanning carriage. When the scanning carriage velocity has slowed sufficiently, the brake is inactivated. In a preferred embodiment in order to prevent the brake from locking up (effecting a full stop at an undesirable time), a brake on time of 10 milliseconds maximum has been established. An off time minimum of 10 milliseconds has also been established after a brake on time.

For a better understanding of the present invention, reference may be had to the accompanying drawings wherein the same reference numerals have been applied to like parts and wherein.

Figure 1:
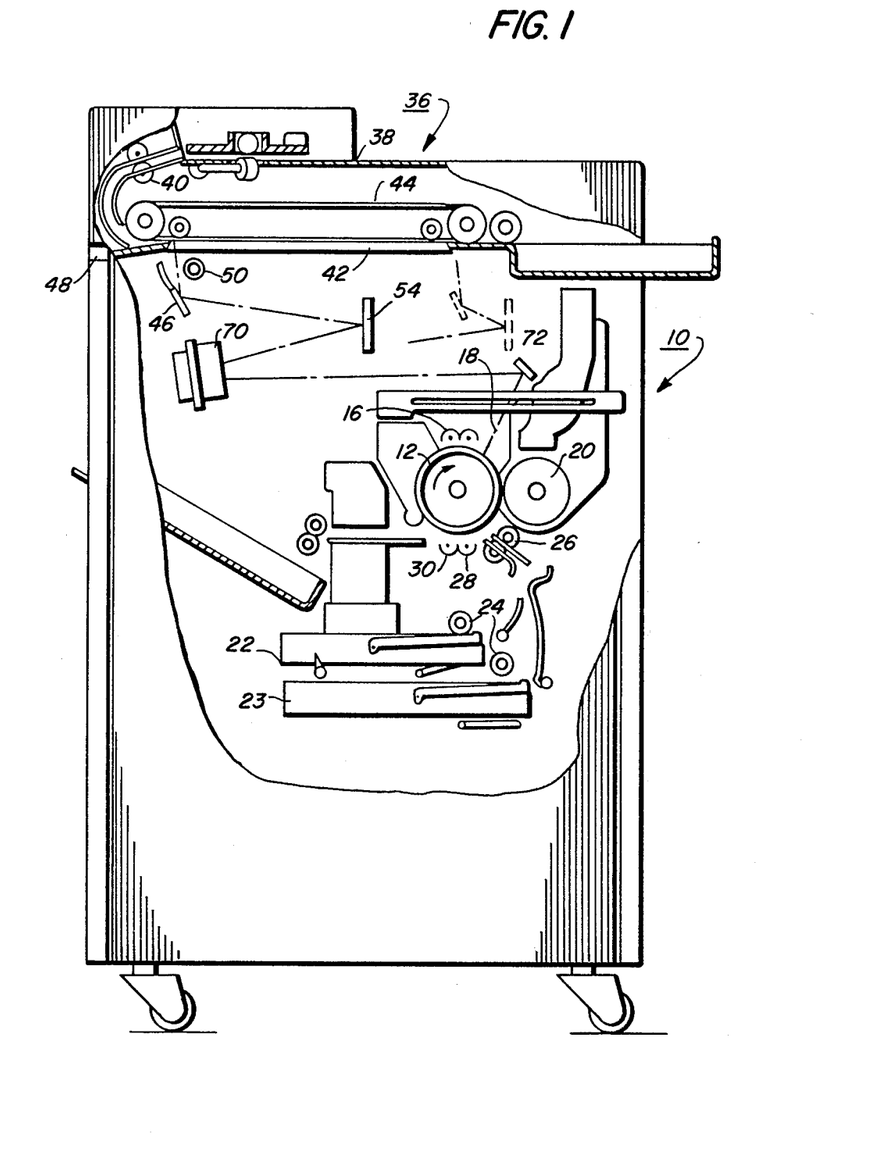
FIG. 1 is an elevational view of a reproduction machine incorporating the present invention.

Referring now to FIG. 1, there is shown by way of example a an electrostatographic printing machine 10 incorporating the programmed brake system of the present invention. It should become evident from the following description that the programmed brake system is suitable for use in a wide variety of image processing systems and other systems having a velocity control requirement.

The machine 10, employs an image recording drum having its surface 12 coated with a suitable photoconductive material. The drum rotates about shaft 14 in the direction indicated by the arrow to bring the image-bearing surface 12 past a plurality of xerographic processing stations.

The drum moves the photoconductive surface 12 through a charging station 16 for placing an electrostatic charge uniformly over the photoconductive surface 12. Thereafter, the drum is rotated to exposure staiton 18 for exposure of the charged photoconductive surface 12. to a light image of an original document. After exposure, the drum rotates the electrostatic latent image recorded on the photoconductive surface 12 to development station 20 wherein a conventional developer mix is applied to the photoconductive surface 12 of the drum rendering the latent image visible.

Sheets of final support material are supported in a stack arrangement on a support tray 22 or 23. A sheet separator 24 feeds individual sheets from tray 22 or 23 to the registration system 26. The sheet is then conveyed to the transfer station 28 in proper registration with the image on the drum. The developed image on the photoconductive surface 12 is brought into contact with the sheet of final support material within the transfer station 28 and the toner image is transferred from the photoconductive surface 12 to the contacting side of the final support material. Following transfer of the image, the final support material is transported through a detack station where detack corotron 30 uniformly charges the support material to separate it from the drum.

The copy sheet is then advanced to a fuser 32 to coalesce the transferred powder image to the copy sheet. After the fusing process, the sheet is advanced to a suitable output device such as tray 34.

A document handler 36 can be provided, including an input location 38 for inserting documents. When a document is inserted, a document alignment roll 40 feeds the document forward. The document is fed around 180° curved guides onto the platen 42 by a platen belt transport 44.

Figure 2:
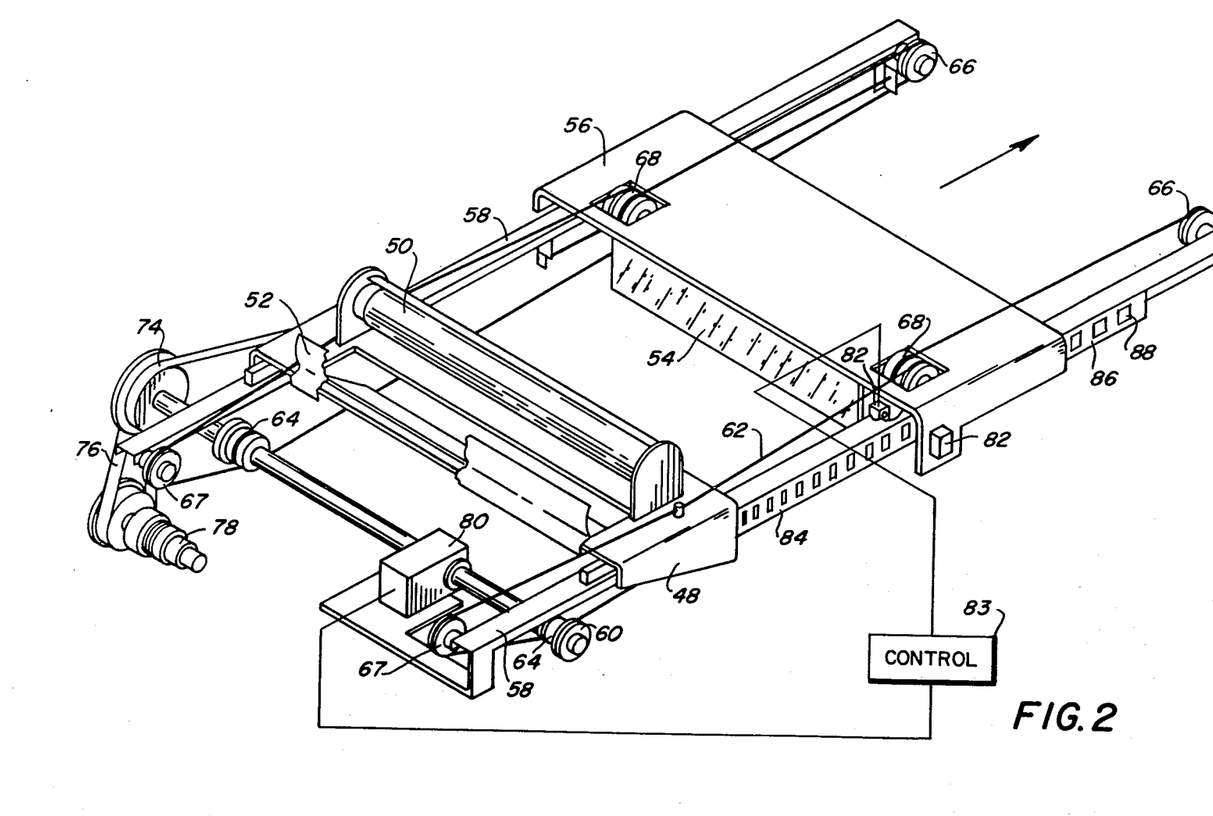
FIG. 2 is an isometric view of the scanning carriage incorporating the present invention.
Figure 3:
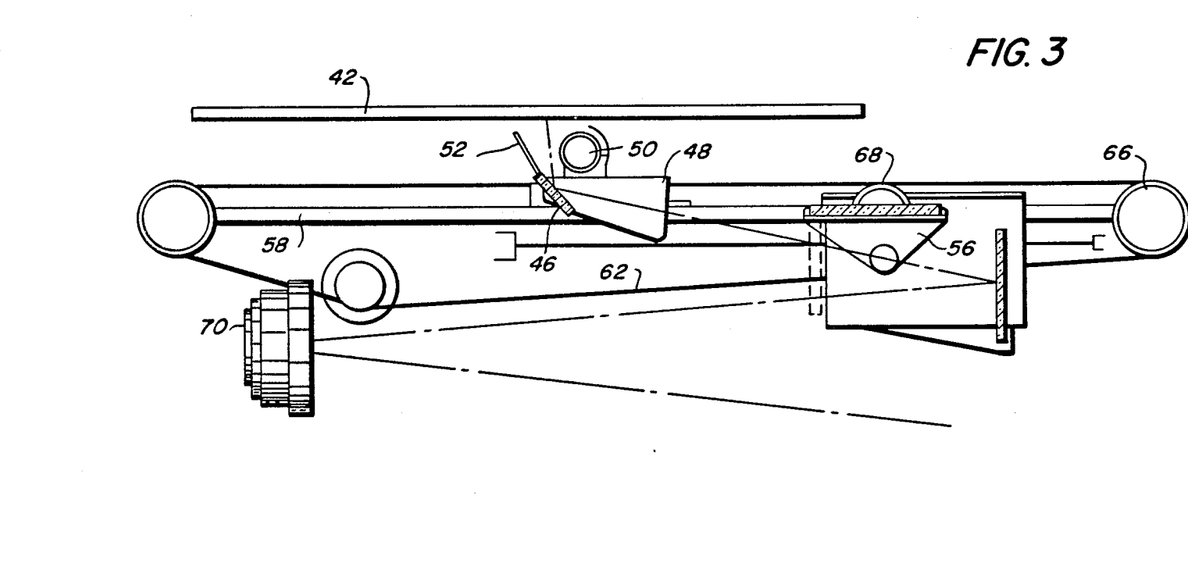
FIG. 3 is an elevational view of the scanning carriage of FIG. 2.

With reference to FIGS. 1, 2 and 3, the image of the document is projected from platen 42 by means of a full rate mirror 46 scanning the entire original document. The mirror 46 is carried by a full rate scanning carriage 48, the carriage 48 also supporting the illuminating lamp 50 and the object reflector 52. As the full rate mirror 46 scans the original document on the platen 42, the half rate mirror 54 mounted on half rate carriage 56 moves at one half the rate of the full rate mirror 46 to maintain the object to lens conjugate equal to the lens to image conjugate. Typically, the length of the scan of the full rate mirror 46 is the length of a normal letter size doucment. With larger documents clearly the length of scan of the full rate mirror must be at least as large as the document and the half rate scanning mirror must also be moved an additional distance at one half the rate of the full rate mirror.

Both the full rate mirror carriage 48 and the half rate mirror carriage 56 ride on parallel optical guide rails 58 and are driven by the optics drive shaft 60. The optics drive shaft 60 is driven from a main drive belt from the machine main driver motor (not shown). The carriages 48 and 56 are driven by means of cables 62 that are coiled around capstans 64 and wrapped around optics idler wheels 66. With the arrangement shown in FIG. 2, the cables are also wrapped around idler wheels 68 for transporting the half rate carriage 56.

Light rays from the object of document on platen 42 are reflected from half rate mirror 54 to the half lens system 70 which collects light from the input side of the lens and forms an image that is reflected from the drum mirror 72 onto the photoreceptor surface 12.

In operation, with reference to FIGS. 2 and 3, as soon as the main drive motor turns on, mechanical drive is applied to the scan drive clutch 74 via scan drive belt 76. The scan drive clutch energizes and rotates the scan drive shaft 60 in the scan direction, that is, in the direction of the arrow in FIG. 2. The rotation of the scan drive shaft 60 turns the scan drive pulleys 66, and in turn drive is transmitted to the optical carriage assemblies 48 and 56 via the scan drive cable 62. A return spring 78 is also provided. In driving the carriages from the home to end of scan position, the direction of the arrow in FIG. 2, the return spring 78 is wound up.

When the full rate carriage 48 reaches the end of scan position and a (not shown) scan switch is actuated, the scan drive clutch 74 will de-energize. This causes the return spring 78, to unwind rapidly causing the scan drive shaft 60 to rotate in the reverse direction. This reverse rotation winds up the scan cables on the scan drive pulleys 67, now in the opposite direction, causing the carriages 48, 56 to move from the end of scan to the scan home position. It should be noted that, preferably, the length of scan will be determined by the length of the document to be copied. Thus, the return scan will often begin from different end of scan positions. At these times the logic not the scan switch will cause the drive clutch to de-energize.

The scan drive shaft 60 is journalled in any suitable electromagnetic brake assembly 80. It is important to return the carriages back to the home position as fast as possible for efficient operation and yet control the deceleration of the carriages 48, 56 in order not to damage the optical components or to cause excessive noise. If the return spring 78 is adjusted too loose, the full rate carriage may never reach the scan home position. On the other hand, if the return spring is adjusted too tightly, the carriages may be driven into the machine frame at too high a velocity. Accordingly, the electromagnetic brake 80 provides a controlled stopping of the carriages to prevent damage. That is, the electromagnetic brake provides latitude to the spring by controlling a deceleration profile. It should be noted that instead of a brake, deceleration could be provided by controlling the clutch that drove the carriage forward in the same manner as described for the brake.

In accordance with the present invention, a suitable electromechanical sensor 82, preferably mounted on the half rate carriage 56, moves in communication with a stationary rigidly fastened grating. The grating 84 comprises a frame 86 including a plurality of variable width unevenly spaced apertures 88. In the preferred embodiment, the apertures are etched in beryllium.

Figure 4:
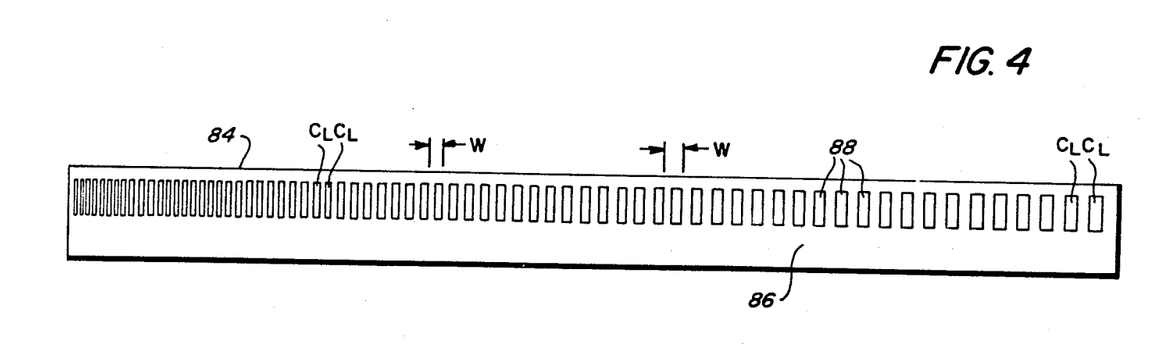
FIG. 4 is an illustration of the grating as shown in FIG. 3.

With respect to FIG. 2, the electro-optic sensor 82 moves with respect to the grating 84 opposite the direction of the arrow, or right to left during return scan. The stationary grating 84, illustrated in detail in FIG. 4, presents to the sensor 82 apertures 88 of progressively smaller width. That is, assuming the sensor 82 moves in the direction of the arrow in FIG. 4, the center line to center line spacing CL-CL of the apertures 88 becomes smaller, and also the width W of the apertures 88 becomes smaller. As the sensor 82 moves relative to the grating 84, the light pulse emitted from the electro-optic sensor 82 will either pass through an aperture 88 or be blocked by the frame 86 of the grating 84. The electromagnetic sensor 82 and brake 80 are electrically connected to the control 83 as illustrated in FIG. 2. For a more detailed description of the control 83, reference is made to copending application Ser. No. 080,624 filed Oct. 1, 1979 incorporated herein.

In accordance with the present invention, light pulses sensed by the electro-optic sensor 82 passing through each of the apertures 88 provide corresponding electrical pulse signals conveyed to the control 83. In response to the electrical pulse signals, the control 83 selectively activates the electromagnetic brake 80 to decelerate the scanning carriages 48 and 56 according to a predetermined deceleration profile. In a preferred embodiment, the full rate scanning carriage is decelerated from a speed of approximately 90 inches per second (ips) to a complete stop. It should be noted that the control could be implemented with other devices such as an optical disc mounted on a capstan shaft.

The control operation is best explained by a specific example. Assume a fixed clock rate of 30 microseconds. That is, there is an electro-optic sense operation once every 30 microseconds. Since there is relative movement between the sensor 82 and the grating apertures 88, there will be a given number of sense operations within an aperture 88 depending upon the relative speed. One means to provide the profile is to require that the sense period or time period for sense operations within a given aperture is constant for any size aperture. This constant time period is assumed to be 3 milliseconds. In other words, it is desired to maintain a 3 millisecond time period for the sensor 82 to obtain measurements across any given aperture 88. Therefore, to obtain this constant time period, the relative speed of the sensor and the apertures must be greater for the larger width apertures than for the smaller width apertures.

With these assumptions, the next step is to determine aperture widths to provide a desired deceleration profile. By selectively decreasing the aperture widths in the direction of movement of the sensor, a given rate of deceleration can be achieved. In fact, the deceleration is controlled by maintaining the speed of deceleration to maintain a constant 3 millisecond time period within each of the apertures.

Therefore, assume the initial speed to be detected for the large width apertures is 90 inches per second and that deceleration is in 2.5 inches per second increments. Because we are decelerating presumably in a linear path, $$D = \frac{V_1 + V_2}{2} \times t$$

where D equals the aperture pitch W (distance from leading edge of one aperture to leading edge of adjacent aperture). $V_1$ and $V_2$ equal the velocity of the scanning carriage at beginning and end of the aperture, and T equals the desired constant time period across the aperture.

$$D = \frac{90 + 88.5}{2} \times .003 = .268 \text{ inch}$$

Thus, the desired aperture width is 0.268 inch for a speed of 90 ips. For a desired velocity of the scanning carriage of 45 inches per second, the required aperture space is approximately 0.132 inch to maintain a 3 millisecond time period across the aperture. Thus, the aperture widths together with the electro-optic sensor program or control a desired scanning carriage deceleration profile.

In a preferred embodiment, the grating has 60 aperture pitches. Therefore, the length of the grating to decelerate from 90 ips to 0 ips is $$L = \frac{V_{90} + V_0}{2} \times (W \times .003) = \frac{90 + 0}{2} \times (60 \times .003) = 8.1 \text{ inch.}$$

The actual deceleration control is accomplished in the following manner. We have assumed that there is a 30 microsecond clock. We have also assumed a 3 millisecond time period. Therefore, if we are maintaining the 3 millisecond time period, there are $$\frac{3 \text{ milliseconds}}{30 \text{ microseconds}} = 100 \text{ clock pulses per time period}$$

if the scanning carriage is following the program speed.

Assume, however, that as the scanning carriage passes the first 0.268 inch width aperture, it is traveling at a greater speed than 90 inches per second. Therefore, since it is traveling at a greater speed, there is less than a 3 millisecond time period across the 0.268 inch space. Therefore, less than 100 clock pulses will be detected by the sensor 82. This condition, indicating overspeed, will initiate or generate a signal to brake 80 to slow the scanning carriage. If there are more than 100 clock pulses counted, this will indicate an underspeed condition, and no braking action will be taken.

Likewise, across the 0.133 inch aperture the carriage is programmed to be moving at 45 inches per second. The number of light pulses obtained within the aperture space is counted and if greater than 100, indicating an underspeed condition, there will be no action. However, if less than 100 pulses are counted, indicating an overspeed condition, a braking action will be initiated. Preferably, once the brake is activated, it will remain on a maximum of 10 milliseconds. However, once the brake is inactivated, either because of an underspeed condition or the termination of the 10 millisecond time period, the brake will be inactivated for a period of 10 milliseconds. This 10 millisecond on, 10 millisecond off ratio insures a smooth deceleration profile.

Any single pitch of the grating, i.e. the distance between leading edges of successive apertures can be equal distance in time or can be dimensionally equal spaced. In the higher velocity positions, you would tend to make them equal distance in time. However, at low speeds because of sensor considerations for the last slot, equal dimensional spacing may be desirable. Additionally, the system is designed to hard stop at 6 ips (0.34 mph).

Figure 5:
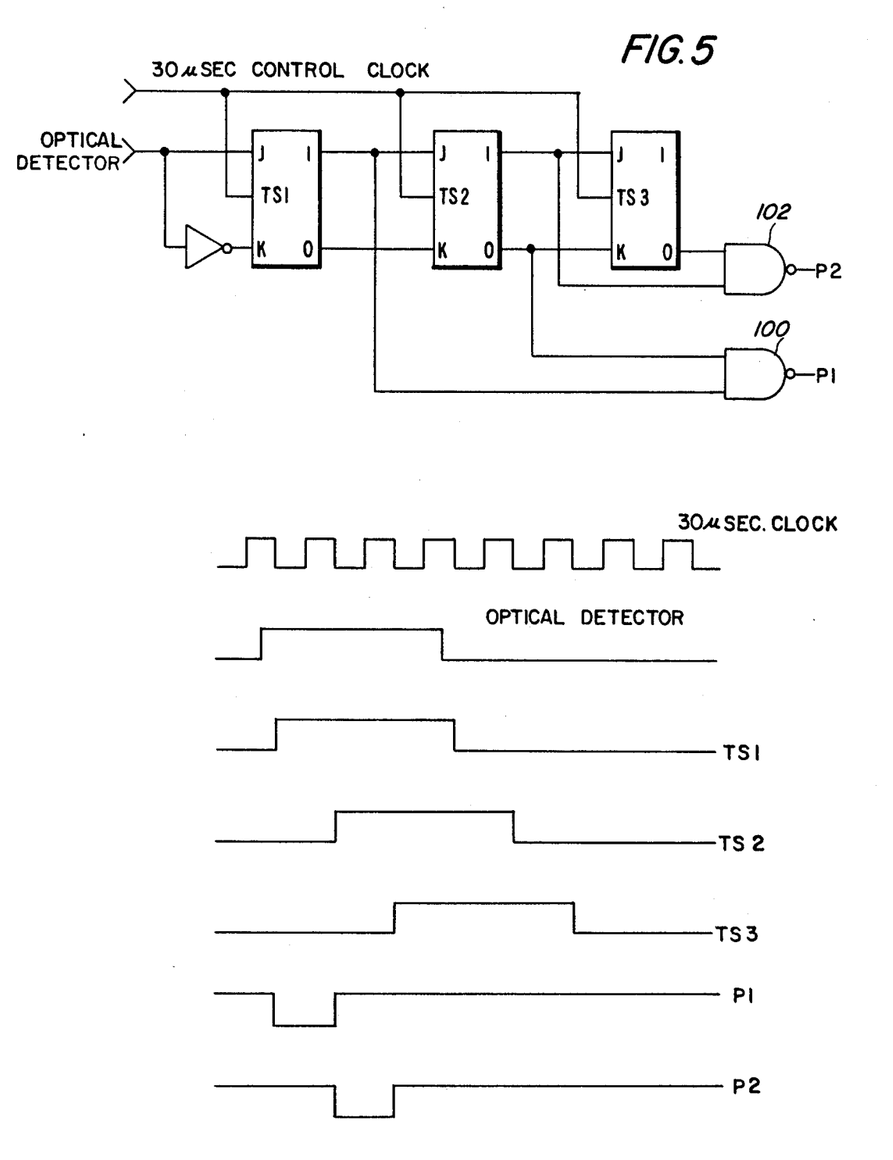
FIGS. 5 and 6 are electrical schematics of the circuitry for controlling the electromechanical brake in accordance with the present invention.
Figure 6:
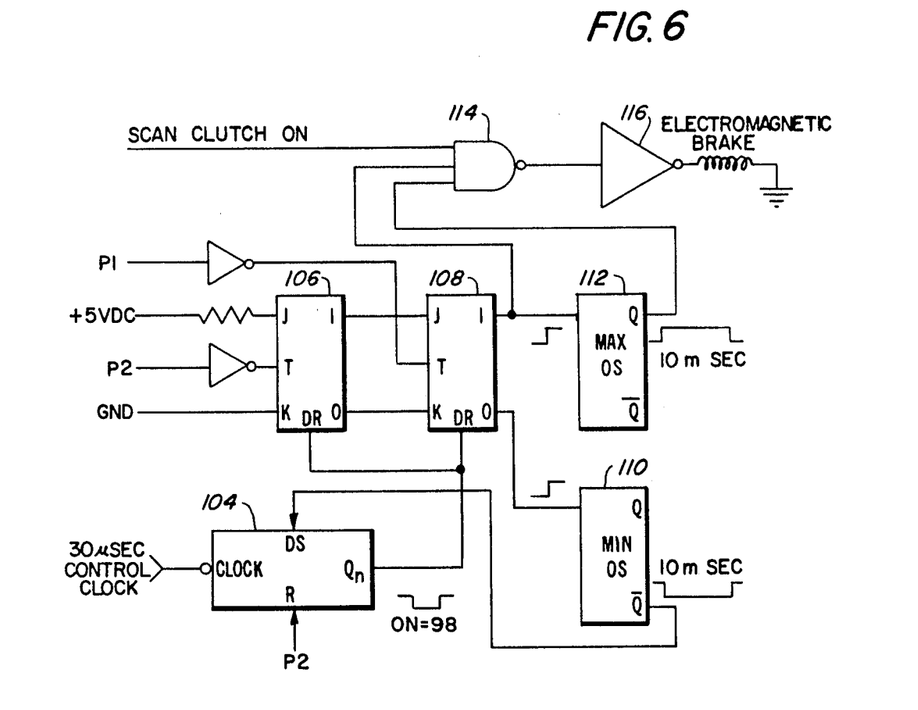

In general, the return speed of the carriage 48 is monitored as the sensor 82 scans past each of the apertures 88 of the grating 84. With reference to FIGS. 5 and 6, the pulses P1 and P2 are produced for each new aperture detected. These pulses initiate the counting of counter 104. The number of pulses sensed by sensor 82 for each of the apertures is counted and depending upon the count, an underspeed or overspeed condition is indicated. If an underspeed condition is indicated, the brake 80 is turned off or is maintained in the off condition. On the other hand, an overspeed condition will be conveyed to a maximum one shot multivibrator 112 and to NAND gate 114. This will cause the turn on of the electromagnetic brake 80 for 10 milliseconds or until an underspeed condition is indicated.

In particular, in FIG. 5 there is shown a shift register including flip flops TS1, TS2 and TS3. The signal from the sensor 82 is conveyed to flip-flop TS1 and each of the flip-flops is electrically connected to the 30 microsecond control clock. As the clock signal shifts from minus to plus, the shift register flip-flops sequentially shift from minus to plus providing pulses P1 and P2 at the output of the respective NAND gates 100 and 102. FIG. 5 also illustrates the signal waveforms of the optical detector, the control clock, P1, P2 and the outputs of the flip-flops TS1, TS2 and TS3.

With reference to FIG. 6, the counter 104 receives a 30 microsecond control clock pulse, a P2 signal, a dominant set signal DS, and provides an output signal at QN to each of two flip-flops 106, 108. In operation, the counter number 104, records the number of clock signals occurring in the time period for the sensor 82 to scan past a single aperture 88. A count of clock pulses including the single P2 signal greater than 98 manifests an underspeed condition of the carriage. The output signal at QN is a 30 microsecond pulse (equal to the length of one control clock) and provides a negative pulse to a dominant reset (DR) of flip-flops 106 and 108. In this condition the brake 80 is inactivated or remains inactivated.

An underspeed condition is expressed by flip-flop 106 being low at time P1 and an overspeed is expressed by flip-flop 106 being high at time P1. Flip-flop 108 is set when flip-flop 106 indicates an overspeed at time P1. The flip-flop 106 information is transferred to flip-flop 108 at the time of pulse P1. Pulse P2 then simultaneously resets flip-flop 106 and resets counter 104.

It should be noted that pulse P2 will not override a dominant reset from the output of counter 104. It can be seen that the contents of flip-flop 106 are examined and transferred to flip-flop 108 for each new aperture 88 of the grating or grating increment except when inhibited by a dominant reset.

In operation, with reference to flip-flops 106 and 108, a count of 98 or greater from counter 104 indicates underspeed. The 10 millisecond minimum one shot multivibrator 110 dictates the minimum off time of the brake. The output of the multivibrator 110 sets counter 104 to 98 and thus holds the counter output low. That is, should a P2 pulse occur at the same time as the off time pulse QN occurs, the dominant reset will prevent flip-flops 106 and 108 from switching.

The output of flip-flop 108 controls the 10 millisecond one shot multivibrator 112. The output of the maximum one shot multivibrator 112 is one input to the three input driver NAND gate 114. The purpose of the maximum one shot multivibrator 112 is to limit the maximum on time of the driver 116. A second output of flip-flop 108 goes directly to the driver NAND gate 114. This signal turns off the driver NAND gate 114 and thus the electromagnetic brake 80 immediately upon detecting that the system is running under speed. It also maintains the brake 80 in an off condition if it is already in an off condition. Each time that NAND gate 114 changes states from a logic "0" to a logic "1", the 10 millisecond minimum one shot multivibrator 110 is set. The minimum one shot multivibrator 110 prevents flip-flop 108 from turning on the driver 116.

Figure 7:
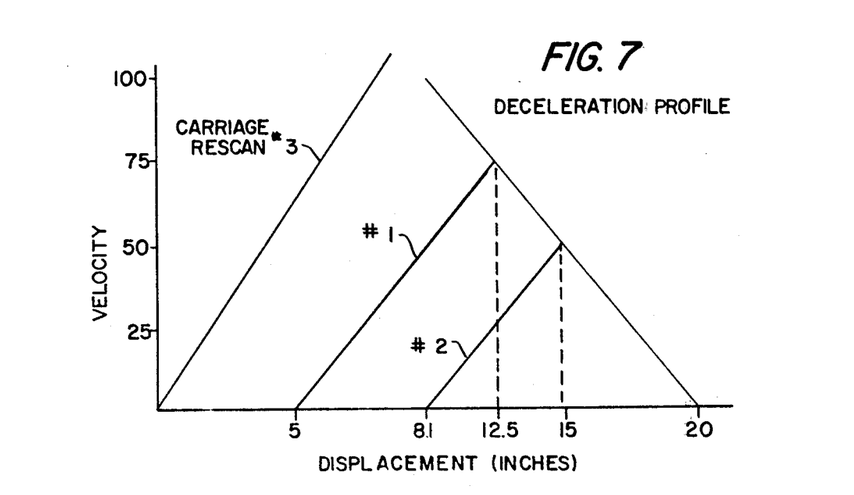
FIG. 7 is an illustration of the carriage velocity intercept of the deceleration profile in accordance with the present invention.

With reference to FIG. 7, the intercept operation of the carriage rescan with the programmed brake profile is illustrated. The y axis of the graph in FIG. 7 shows the rescan velocity in inches per second from 0 to 100 inches per second. The x axis of the graph illustrates the displacement of the scan carriage 48 in inches from 0 to 20 inches. Zero represents the position of the scan carriage at the end of document scan position. The carriage 48 in the rescan operation traverses from the end of scan position to the home or beginning of scan position represented by a displacement of 20 inches. That is, the home position of the carriage 48 as illustrated in FIG. 2 is a 20 inch displacement from the furthest end of scan position.

The deceleration rate or programmed brake profile is shown by the deceleration profile on the graph. It is illustrated as a straight line decending from a velocity of 90 inches per second at a displacement of 11.9 inches (20−8.1 inch) to zero velocity at a displacement of 20 inches. It should be noted that the profile extending from 11.9 to 20 displacement inches represents the length of the grating 94 as shown in FIGS. 2 and 4. If the carriage 48 is scanned beyond 8.1 inches, it will not intercept the grating 84 until it has moved to a position 8.1 inches from the home position.

Assume the carriage 48 rescan is following a velocity profile exhibited by the line carriage rescan number 1. This line represents a scan that covered 15 inches and reached the end of scan position at zero velocity and at a position shown as 5 on the graph. The carriage then begins its rescan movement and begins to accelerate. There will be no control over the scanning carriage until it reaches the grating 84 at a position of 8.1 inches from the home position illustrated as 11.9 on the x axis. However, since at position 11.9 the carriage is underspeed at approximately a speed of 50 inches per second, no control will be exerted over the scanning carriage 48. As shown on the graph, however, at a position of approximately 14.0 inches, that is 14.0 inches from the maximum end of scan position and 6.0 inches from the home position, the velocity will intercept the deceleration profile. Instead of the scan carriage continuing to accelerate, the carriage movement will be controlled by the sensor and grating relative movement and will follow the deceleration profile to a zero velocity condition at the home position.

Assume, now that the forward scan is only 8.1 inches. The rescan then, will begin at the position 11.9 inches on the graph. A hypothetical rescan profile is shown as rescan number 2 on the graph. As shown, the velocity of the carriage during rescan increases until the speed intersects the deceleration profile at a distance of approximately 16, or 4 inches from the home position. The carriage will then be decelerated in accordance with the deceleration profile.

The final hypothetical rescan condition is shown as rescan number 3. As seen on the chart, the rescan velocity is well in excess of 90 inches per second before reaching the deceleration profile or grating 84 at the 11.9 inch displacement. In this case, the control will immediately brake the return carriage 48 to slow down the carriage to cause the speed to decrease to a point of intersecting the deceleration profile. The carriage will then continue to decelerate according to the deceleration profile.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. In a reproduction machine having a photoreceptor, an optical system, a carriage, a brake mechanically connected to the carriage, and a platen, the carriage scanning the platen in a first direction for projecting images of objects on the platen onto the photoreceptor, by means of the optical system, and means for controlling the speed of the scanning carriage including a control a displacement sensor mounted on the carriage and a grating including a frame having a plurality of spaced apertures, the grating rigidly secured to the reproduction machine, the senor disposed in relation to the grating to provide signals manifesting the speed of the carriage with respect to the sensor, the control responsive to the signals to selectively activate the brake to change the speed of the carriage in a second direction.

2. The reproduction machine of claim 1 wherein the displacement sensor detects light signals as a function of the spaced apertures and the relative speed of the sensor and the carriage, the apertures having variable widths.

3. The reproduction machine of claim 1 including a fixed rate signal, and counter circuitry, the counter circuitry responsive to the fixed rate signal to determine the number of signals within an aperture, the number of signals within a given aperture manifesting either an underspeed or an over speed of the carriage.

4. The reproduction machine of claim 3 including a transistor driver, the transistor driver electrically connected to the counter circuitry and responsive to an over speed condition to trigger the transistor driver and activate the brake.

5. The machine of claim 1 wherein the width of the apertures at one end of the frame is significantly greater than the width of the apertures at the other end of the frame.

6. The machine of claim 5 in which the widths of the apertures are profiled to provide a given deceleration rate.

7. In a reproduction machine having a photoreceptor, a scanning mechanism, a scanning mechanism control, and a platen, the scanning mechanism projecting images of objects on the platen onto the photoreceptor in a first direction, a sensor, and a grating, the grating and the sensor being in communication to determine the speed of the scanning mechanism, one of the sensor and grating being secured to the scanning mechanism and the other of the sensor and grating gauge being fixed to the reproduction machine, the method of controlling the speed of the scanning mechanism in a second direction including the steps of providing a reference signal representing a reference speed of the scanning mechanism counting the signal sensed for an aperture, said signals representing scanning mechanism speed, determining the deviation of the mechanism speed from the reference speed for the given count, and controlling the speed of the scanning mechanism by the scanning mechanism control in response to the deviation from the reference speed.

8. The method of claim 7 including the step of arresting the motion of the scanning mechanism in response to a predetermined count.

9. The method of claim 7 wherein the grating includes a frame having a plurality of spaced apertures of non-uniform width, the width of the apertures decreasing in the direction of movement of the scanning mechanism including the step of counting light pulses through each of the apertures and comparing to a reference count.

10. The method of claim 9 including the step of arresting the motion of the scanning mechanism if the signal count through a given aperture is less than the reference count.

11. In a reproduction machine including a scanning carriage, a grating have a plurality of apertures, an electro-optic sensor, the grating and sensor mounted for relative motion one of the grating and sensor secured to the scanning carriage, the sensor detecting light pulses through the apertures, a speed control comprising a brake connected to the carriage for controlling speed in a predetermined direction of the carriage, and a counter to determine the number of light pulses through an aperture whereby a predetermined count initiates activation of the brake to slow the movement of the carriage in said predetermined direction.

12. The speed control of claim 11 wherein the sensor is mounted on the scanning carriage and the grating is rigidly secured to the machine frame.

13. A speed control in a reproduction machine having a photoreceptor, a carriage and a platen, the carriage scanning the platen in a first direction for projecting images of objects on the platen onto the photoreceptor, the speed control comprising a carriage control, a programmed means, a sensor and a grating including a frame having a plurality of spaced apertures, the spacing of the apertures being non-uniform, the sensor and grating mounted for relative motion, the sensor disposed in relation to the grating to provide signals, the carriage control responsive to the signals for the control of the speed of the carriage in a second direction.

14. The speed control of claim 13 including a brake, a counter, a gate electrically connected to the brake, and logic circuitry connected between the counter and the gate, the logic circuitry responding to the counter to selectively activate the brake.

15. The speed control of claim 13 including a brake wherein the carriage scans the platen in a first direction from a start of scan position to an end of scan position to project an image onto the photoreceptor and the carriage traverses the platen in a second direction to return the carriage to the start of scan position, the brake being selectively activated to control the speed of the carriage in the second direction.

16. The speed control of claim 15 wherein the control of the speed of the carriage in the second direction is initiated upon the communication of the sensor with the grating.

17. The speed control of claim 15 wherein the end of scan position and the return speed of the carriage are variable, the communication of the sensor with the grating providing a constant deceleration gradient.

18. The speed control of claim 13 wherein the grating is approximately 8 inches long and positioned at the begin scan position of the carriage.

* * * * *